UNITED STATES PATENT OFFICE.

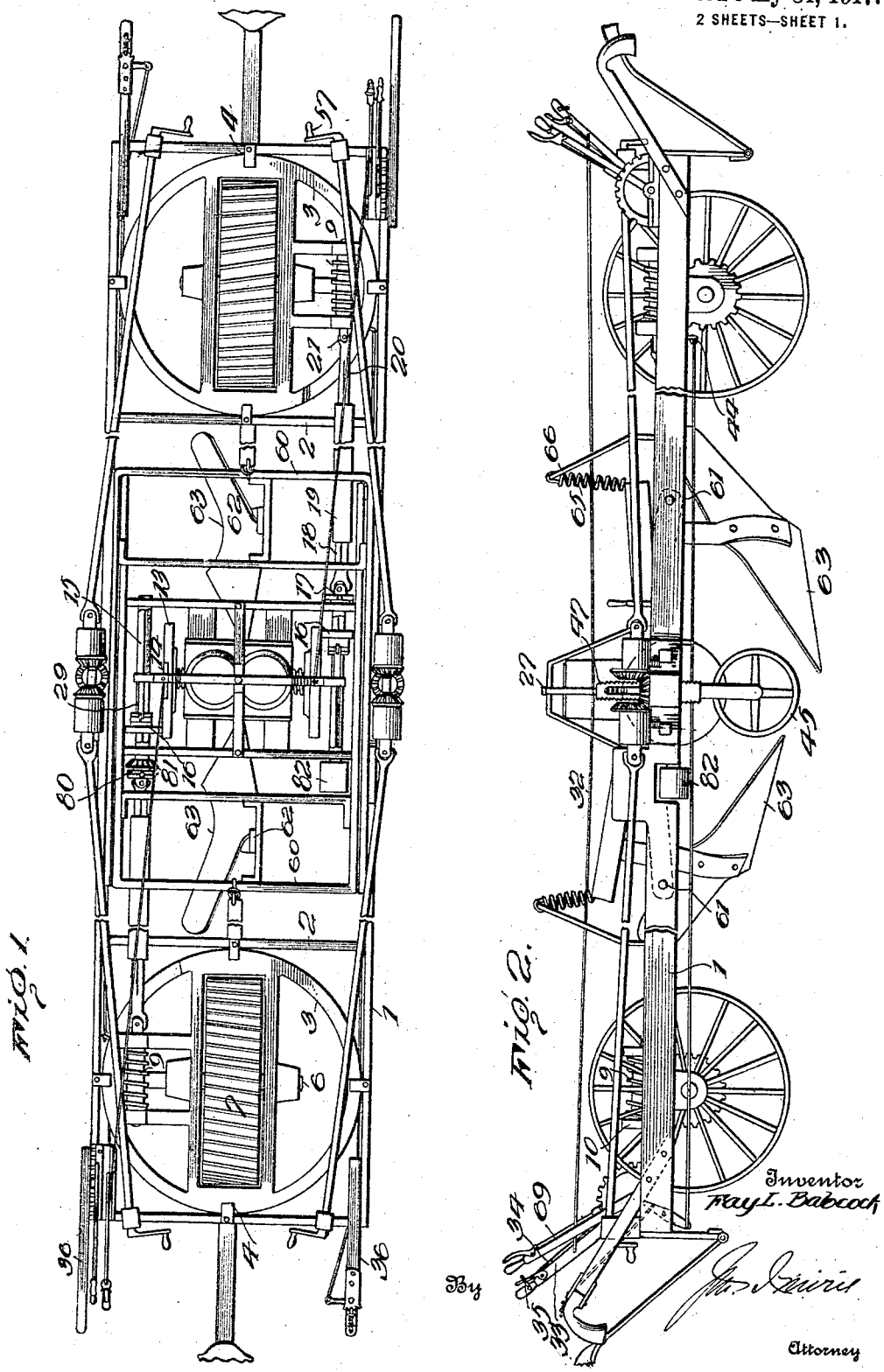

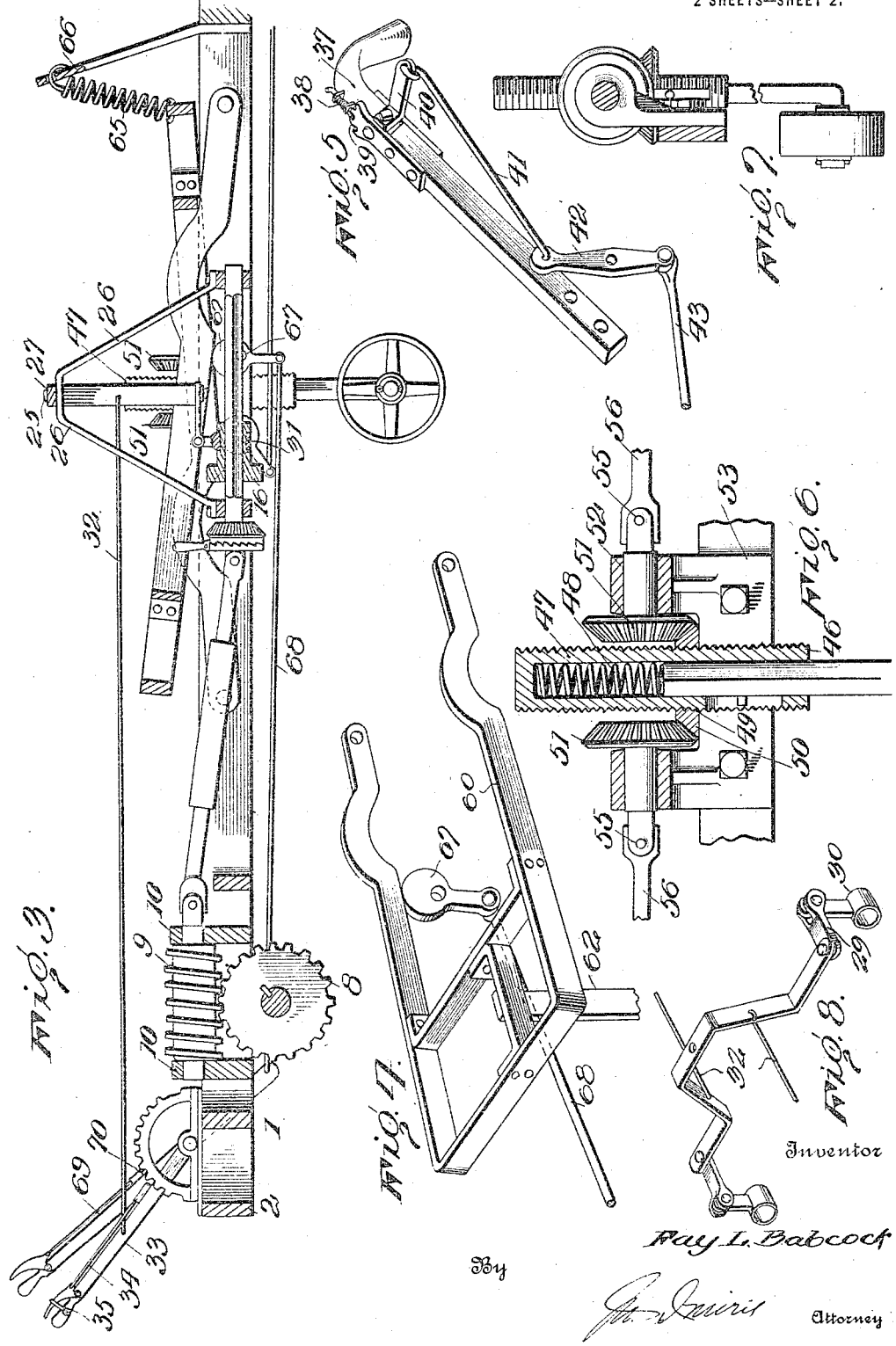

FAY L. BABCOCK, OF WATERFORD, NEW YORK.

AGRICULTURAL MACHINE.

1,235,413. Specification of Letters Patent. Patented July 31, 1917.

Application filed April 29, 1916. Serial No. 94,412.

*To all whom it may concern:*

Be it known that I, FAY L. BABCOCK, a citizen of the United States, residing at Waterford, in the county of Saratoga and State of New York, have invented certain new and useful Improvements in Agricultural Machines, of which the following is a specification.

My invention relates to improvements in agricultural machines, and more particularly to a motor driven plow.

One of the objects of my invention is to provide a machine which may be conveniently used between the rows in a field, and one having steering means at each end for the operator to conveniently keep the plow out of the previously formed furrow, and to also provide convenient means for steering the plow between the rows.

Other objects and advantages of the invention will be hereinafter described and particularly pointed out in the claims.

In the drawings:

Figure 1 is a plan view of my improvement.

Fig. 2 is a side elevation thereof.

Fig. 3 is a detail vertical section on an enlarged scale on the line 3—3 of Fig. 1.

Fig. 4 is a detail perspective view of one of the plow supporting frames.

Fig. 5 is a detail view of one of the handles.

Fig. 6 is an enlarged detail view of a bearing of one of the intermediate supporting wheels.

Fig. 7 is a detail side elevation of the same.

Fig. 8 is a detail view of a part of the means for changing the speed of the plow.

The numeral 1 indicates a rectangular frame provided with cross bars 2. Between the cross bars 2, and each end of the frame 1, is rotatively supported a traction wheel supporting frame 3, held in position by flanges 4, extending from the frame and cross bars, the flanges embracing the edges of the frame 3. Each supporting frame 3 is provided with bearings 5, in which is mounted a shaft 6, carrying a traction wheel 7. One end of the shaft 6 is extended and is provided with a worm gear 8, and meshing with this gear is a worm 9, mounted in bearings 10, extending upwardly from the frame 3.

The traction wheels, shaft, and gearing rotate with the respective frames 3, means being provided for simultaneously operating the gearing of the two frames.

Mounted centrally of the main frame 1, is a motor 12, and on the opposite ends of the motor shaft are friction disks 13, each formed with a central depression 14, and forced outwardly by springs 13$^a$. Mounted in suitable bearings adjacent each friction disk 13, is a square shaft 15, and on each shaft is a friction disk 16, which engages the face of the adjacent friction disk 13, to transmit the power as will presently appear. At the end of each shaft 15, is a universal joint 17, and extending therefrom is a section 18, of a shaft which fits and operates in a sleeve or companion shaft section 19. Adjustably secured to the shaft section 19, is another shaft section 20, which is coupled by means of a universal joint 21, with the shaft of the worm 9.

By means of this construction the power from the motor is transmitted to the traction wheels, consequently if perchance one of the wheels should slip, the power of the engine will be thrown on the other wheel and the necessary traction to advance the plow will be obtained.

Pivoted at 25 to a frame 26, is a lever 27, having its ends bent downwardly toward the frame 1. Pivoted to opposite ends of the lever 27, are links 29, said links being pivoted to ears extending from collars 30, fitted in grooves 31, formed in the hubs of the friction disks 16. Also pivoted at the opposite ends of the lever 27, are rods 32, connected at their outer ends to handles 33, having locking dogs 34. A link 35 is pivoted to each handle 33, and is adapted to be thrown over the finger piece of the locking dog to hold the latter out of engagement with its sector for a purpose to be described.

By operating either of the levers 33, the lever 27 is rocked on its pivot, and the friction disks 16 are moved over the faces of the respective friction disks 13, which regulates the speed of the plow, or to change the direction of movement of the plow, as will be understood. When the friction disks 16 are opposite the depressions 14, and the motor is running, obviously power will not be transmitted to the traction wheels, this construction being conventionally shown to illustrate one means whereby the motor might continue to run while the plow remains stationary.

At opposite ends of the frame 1 are handles 36. One handle of each pair at the ends of the frame is provided with a hinged section 37, having a locking dog 38, co-operating with a sector 39. Extending from the hinged section 37 is an arm 40, connected by a link 41, with a lever 42, pivoted on the main frame 1. Pivoted to the lower end of the lever 42, is a rod 43, connected at its opposite end with a lug 44, descending from the frame 3 at the opposite end of the machine.

This construction is the same for operating both frames 3, and obviously by operating the hinge section 37, the frame 3 can be rotated or adjusted to steer the plow.

In addition to the end traction wheels, the frame is supported intermediate its length by supporting wheels 45, mounted on the lower ends of rods 46. The supporting means is the same for both wheels, and therefore but one will be described.

The rod 46 slides in a hollow threaded member 47, between the top of which and the upper end of rod 46, is a spring 48, to permit the wheel 45 to accommodate itself in passing over uneven surfaces. The threaded element 47 passes through a threaded opening 49, formed in a beveled pinion 50. Meshing with the beveled pinion 50, are two beveled pinions 51, mounted in bearings 52, extending from a bracket 53, secured to the side of the frame 1. The beveled pinion 50 is confined between the bracket 53 and the beveled pinion 51, and is held in operative position thereby. Secured to the respective shafts of the beveled pinions 51, by universal joints 55, are shafts 56, mounted in suitable bearings on the frame 1, and provided at their outer ends with handles 57.

In the operation of the plow one of the supporting wheels 45 will travel in the previously formed furrow, while the companion supporting wheel will travel over the unplowed surface of the soil. Hence it is necessary to provide means, such for instance as described, for quickly and conveniently adjusting the position of the wheels. By turning the crank 57, and through the instrumentality of the beveled pinions, the threaded element is either raised or lowered, which raises and lowers the wheel that it may be adjusted to ride in the bottom of the furrow, that enough of the weight of the machine may be borne by this and the opposite wheel, to keep the machine in a vertical position.

Mounted in the frame 1, between the two traction wheels, are two plow supporting frames 60, oppositely pivoted to the frame 1, at 61. Each frame is U-shaped, and to this frame is attached a depending standard 62, on the lower end of which is a plow 63. The plows face in opposite directions, but are arranged to throw the soil in the same direction. Attached to the cross bar of each plow supporting frame is a spring 65, the upper end of which is connected to a bracket 66, extending from one of the cross bars 2, of the main frame, the spring acting as a counterbalance when operating the frame.

It is to be understood that in the operation of the plow, when going in one direction, one of the plow supporting frames is lowered, while the other is elevated. The operator must have the plows under control so that when reaching the end of the field the plow which was operating can be raised, and the other one lowered to plowing position. Various means may be provided to effect this result, but in the drawings I have illustrated a cam 67, pivoted to the side of the frame 1, each cam having an extension which is connected by a rod 68, with the lower end of a hand lever 69, pivoted at the end of the frame 1, and provided with a locking dog 70.

It is to be understood that the cams engage under the respective plow supporting frames, and when one of the hand levers is operated the cam acts to raise the frame as shown in the drawings, the spring 65 acting as a counterbalance in this position.

While I have described the invention as being applicable to the operation of a plow, it is to be understood that a cultivator or other agricultural implement may be substituted for the plow *per se*. Also by providing clutches as at 80, and a gear wheel 81, other attachments may be operated by the motor. On one of the shafts 15 I have shown a belt wheel 82 for the transmission of power from the motor, if such should be desired. When transmitting power through the medium of the belt wheel 82, the clutches 80 may be disengaged and the frame and the parts supported thereby will remain stationary. The gear wheel 81 may be employed for transmitting motion to a mowing machine or other attachment which may be attached to the plow supporting frame 60, and carried thereby, the invention being susceptible to this use.

In operation, let it be assumed that the plow shown to the right in Fig. 2 is lowered, consequently the machine is moving toward the left, the plow to the left in Fig. 2 having been elevated by operation of the hand lever 69, at the left of the frame 1. The supporting wheels 45, appearing on the near side of the frame in Fig. 2 will be traveling on the surface. Link 35, on the hand lever 33, at the left of the frame will be engaged over the finger piece of the locking dog, so as to hold the latter out of engagement with the sector. The corresponding link of the hand lever at the opposite end of the frame will be out of engagement with the finger piece of the locking dog, so that the operator can, by operating the handle 33 at the right of the machine, manipulate the friction disks 16, the lock-out of the dog on the left hand lever 33 permitting of this movement. In this manner the operator has the speed of the plow under perfect control.

If the traction wheel at the left of Fig. 1 tends to ride in the furrow previously formed, the operator can, by adjusting the hinged lever 37, at the right of the frame, turn the left hand traction wheel 7 to the left, which will, of course, guide the plow in its proper course.

It will be understood that when the end of the field is reached it is simply necessary to reverse the order just described, and proceed in the opposite direction across the field.

What I claim is:—

1. In a tractor adapted to support an agricultural implement, the combination of a frame, traction wheels centrally disposed at opposite ends of the frame, a motor carried by the frame, connections between the motor and the traction wheels, means for independently adjusting the respective traction wheels, and means at opposite ends of the main frame for independently controlling the speed and direction of movement of the traction wheels.

2. In a tractor adapted to support an agricultural implement, the combination of a main frame, a rotatable frame at the opposite ends of the main frame, a traction wheel mounted in each rotatable frame, means for independently rotating the rotatable frames, a motor centrally disposed on the main frame, connections between the motor and the respective traction wheels, and means operable from either end of the main frame for controlling the speed of the traction wheels.

3. In a tractor adapted to support an agricultural implement, the combination of a rectangular frame, a rotatable frame mounted in each end of the rectangular frame, means for independently adjusting the rotatable frames, a motor supported by the rectangular frame, connections between the motor and the traction wheels, means at opposite ends of the main frame for controlling the speed of the traction wheels, an intermediate supporting wheel on each side of the main frame, a cushion for each of said supporting wheels, means at both ends of the main frame for independently raising and lowering the supporting wheels, and a pair of hinged frames supported within the main frame.

4. In a tractor adapted to support an agricultural implement, the combination of a rectangular frame, a traction wheel at each end of the rectangular frame, a rotatable frame supporting each traction wheel, hand levers at the ends of the rectangular frame for moving the rotatable frames, a motor supported by the main frame, connections between the motor and the traction wheels, means for controlling the speed of the traction wheels, and intermediate supporting means on the main frame.

5. In a tractor adapted to support an agricultural implement, the combination of a rectangular frame, a rotatable frame at each end of the rectangular frame, means for adjusting the rotatable frame, a shaft mounted in each rotatable frame, a gear on each shaft, a worm meshing with said gear, means for mounting the worm on the rotatable frame, a motor carried by the rectangular frame, a connection extending from each worm to the motor, each connection comprising universal joints, and a telescopic shaft, and means for regulating the speed of the traction wheels.

6. In a tractor adapted to support an agricultural implement, the combination of a rectangular frame, traction wheels mounted at opposite ends of said frame, means for adjusting the position of said traction wheels, a motor carried by the main frame, connections between the motor and the traction wheels, intermediate supporting wheels carried by the main frame, means for raising and lowering each of said supporting wheels, said means comprising a stem, a hollow threaded element in which the stem fits, a spring interposed between the threaded element and the stem, a pinion having a threaded opening through which the threaded element passes, pinions engaging said first mentioned pinion, and shafts extending from the second mentioned pinions to the opposite ends of the rectangular frame, whereby to operate the threaded element and adjust the supporting wheels.

7. In a tractor adapted to support an agricultural implement, the combination of a rectangular frame, a rotatable frame at each end of the rectangular frame, a traction wheel supported in each rotatable frame, a pair of handles at each end of the rectangular frame, one handle of each pair having a hinged member provided with an extension, a connection between said extension of the handle at one end of the machine and the rotatable frame at the opposite end of the machine whereby to rotate said frame, means for locking the hinged section in adjusted position, a motor carried by the main frame, and connections between the motor and the traction wheels.

8. In a tractor adapted to support an agricultural implement, the combination of a rectangular frame, a rotatable frame supported in each end of the rectangular frame, a traction wheel centrally supported in each rotatable frame, means extending from each rotatable frame to the opposite end of the main frame for operating said rotatable frame, a motor supported by the main frame, connections including gearing from the motor to the traction wheels, intermediate adjustably mounted supporting wheels on the sides of the main frame, and means extending to the ends of the main frame for adjusting the intermediate supporting wheels.

In testimony whereof I affix my signature in the presence of two witnesses.

FAY L. BABCOCK.

Witnesses:
EMILY F. CAMP,
MIRIAM STERN.